Inventors:
Stuart D. Pool
Aaron M. Schaible

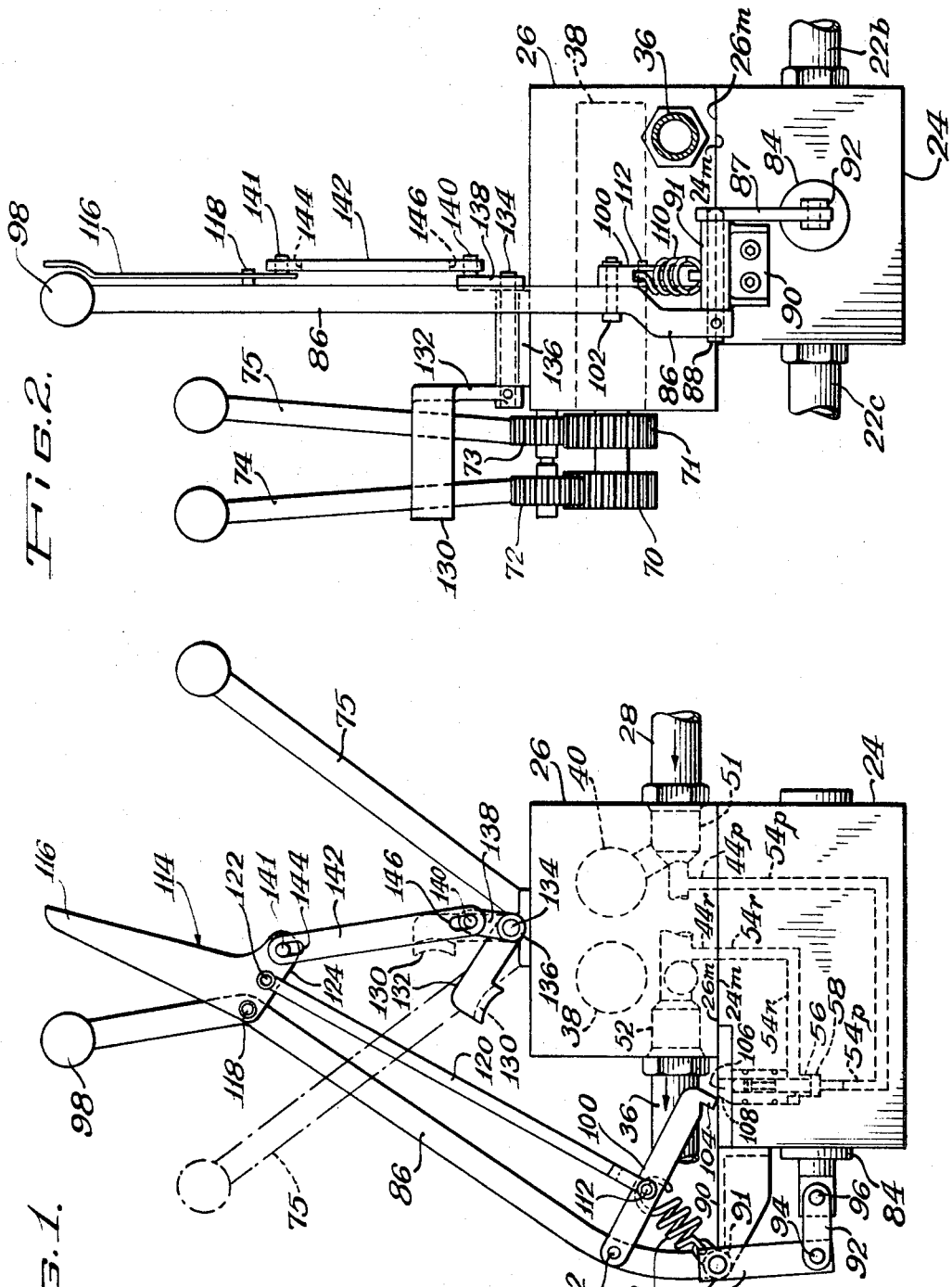

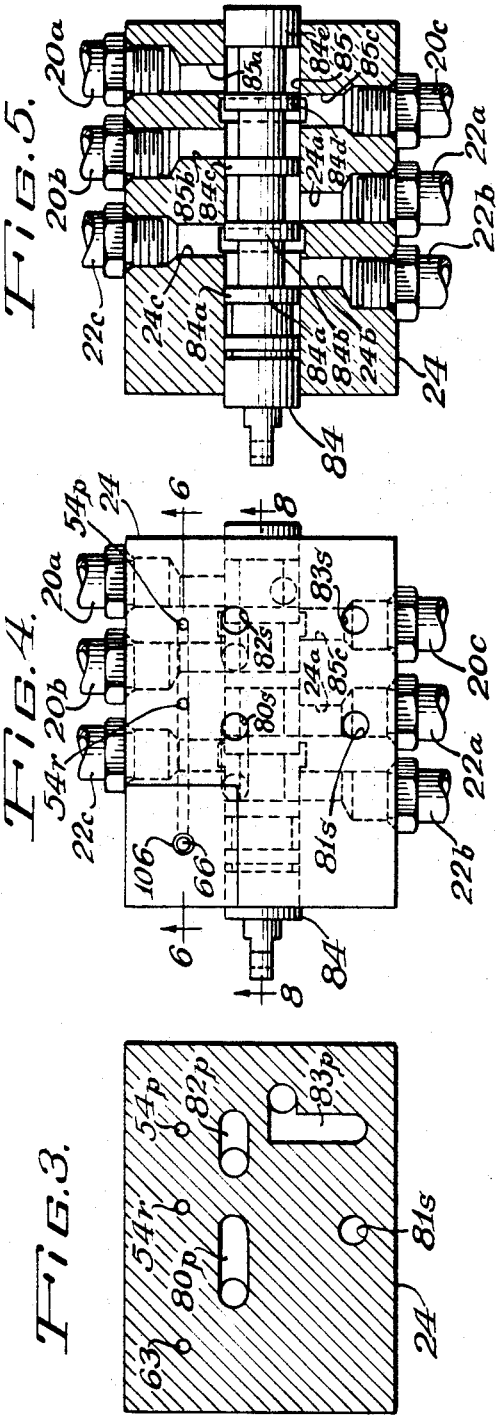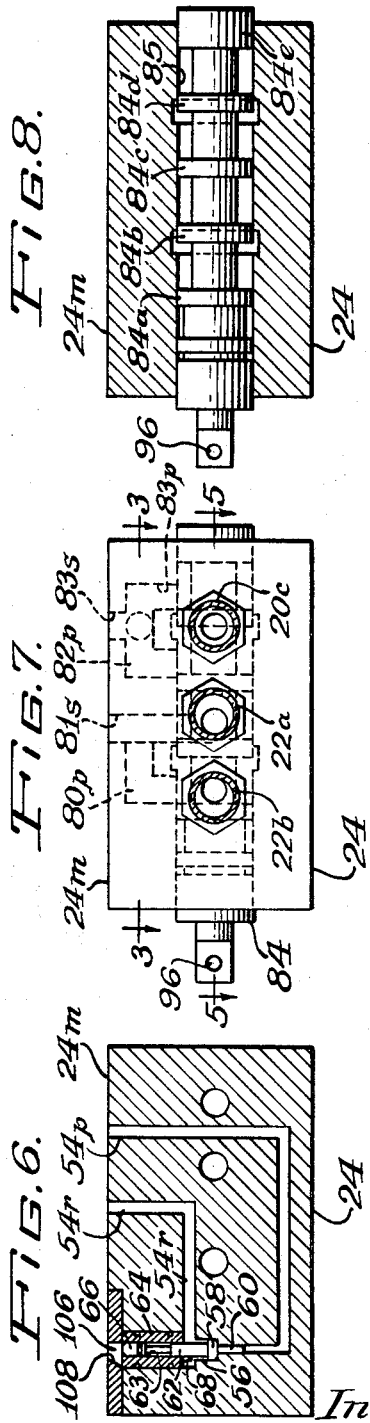

United States Patent Office 3,400,635
Patented Sept. 10, 1968

3,400,635
HYDROSTATIC DRIVE CONTROL
Stuart D. Pool, Naperville, and Aaron M. Schaible, Rockford, Ill., assignors to International Harvester Company, Chicago, Ill., a corporation of Delaware
Filed Oct. 20, 1966, Ser. No. 588,193
10 Claims. (Cl. 91—412)

ABSTRACT OF THE DISCLOSURE

A means for controlling a pair of two-speed, reversible hydraulic motors arrangd to power drive wheels on opposite sides of the vehicle, including a direction control valve for each motor capable of supplying hydraulic fluid under pressure to the associated motor to drive it in either forward or reverse direction, a speed control valve for determining whether the motors will be driven in high speed range or low speed range, means responsive to an increase in pressure differential between motor inlet and outlet to shift said control valve to low range whenever the load imposed upon the motor approaches a stall condition, and mechanical link means for shifting said speed control valve to low range whenever either of the motors is reversed.

---

The present invention relates generally to means for controlling a two-speed, rotary hydraulic motor, and more particularly to means for control of such a motor in its application to propelling a vehicle.

It is an object of this invention to provide a rotary hydraulic motor, which is capable of operating at two different speeds, with means for automatically shifting from its high speed mode of operation to low speed whenever the load imposed thereon approaches stall conditions.

It is also an object of this invention to provide means responsive to a predetermined differential between inlet pressure and outlet pressure for automatically shifting a two-speed hydraulic motor to its low speed mode of operation.

It is another object of the present invention to provide a means for assuring that a two-speed, reversible hydraulic motor is operated efficiently.

It is still another object of the present invention to provide a means for controlling a pair of rotary hydraulic motors which demands that both motors be operated at low speed whenever either of them is reversed.

It is a further object of this invention to provide a control means for a vehicle which is steerable by driving a pair of hydraulic motors at different speeds, which means assures that sharp turns will be executed at slow speed and with safety.

It is a still further object of this invention to provide a control means for a vehicle powered by a pair of hydraulic motors which means is positive and will be unaffected by vibrations.

These and other objects and many of the attendant advantages will become more readily apparent from a perusal of the following description and the accompanying drawings, wherein:

FIGURE 1 is a side elevational view of the present invention;

FIGURE 2 is a front elevtaional view obtained by observing FIGURE 1 from the left;

FIGURE 3 is a cross-sectional view taken on line 3—3 of FIGURE 7;

FIGURE 4 is a top plan view of one component, the speed selective valve, showing the porting therein in dotted lines;

FIGURE 5 is a cross-sectional view taken on line 5—5 of FIGURE 7;

FIGURE 6 is a cross-sectional view taken on line 6—6 of FIGURE 4;

FIGURE 7 is a side elevational view of the speed selector valve;

FIGURE 8 is a cross-sectional view taken on line 8—8 of FIGURE 4; and

Figure 9:
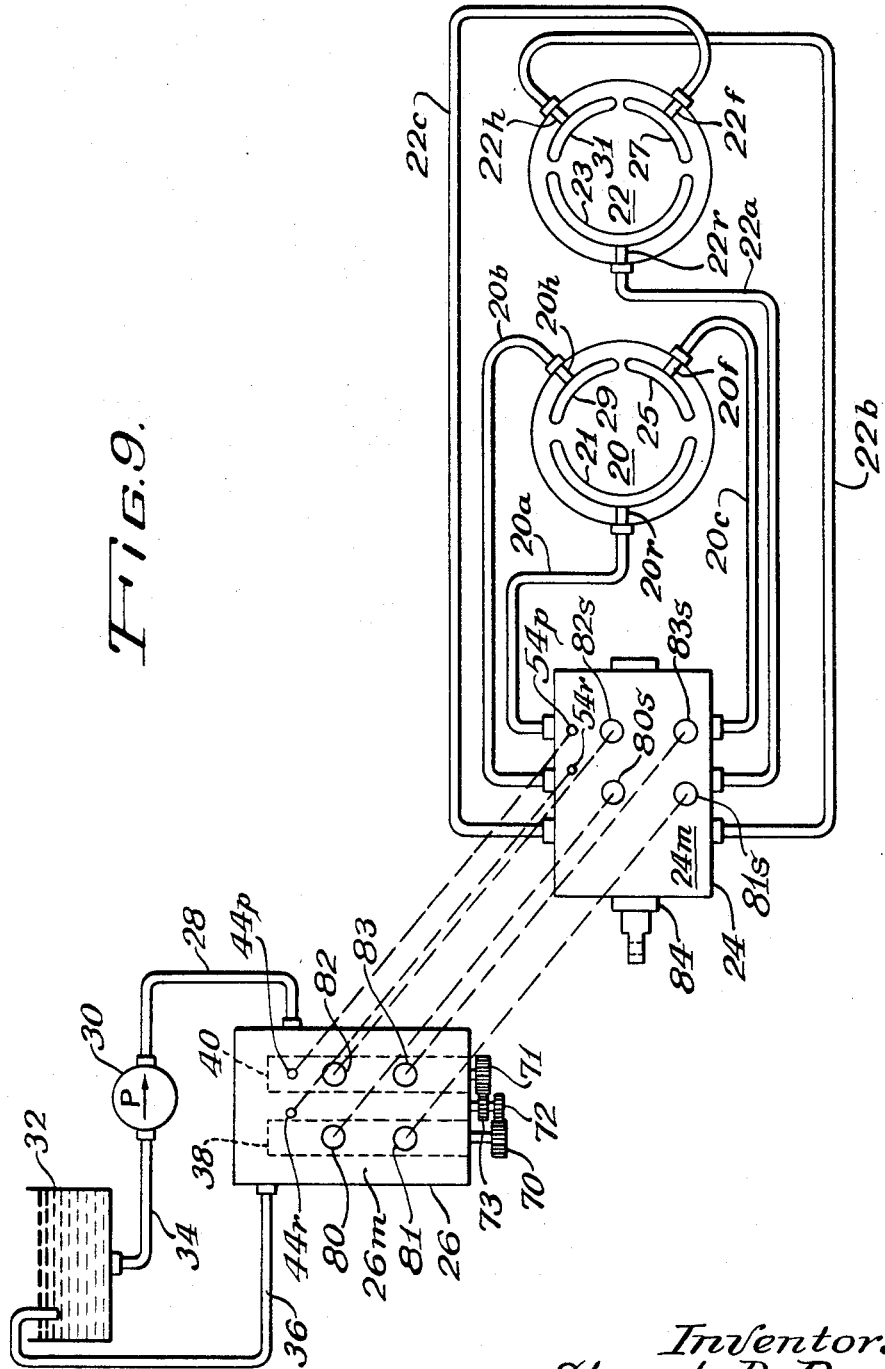
FIGURE 9 is a schematic view of the hydraulic circuitry employed by the present invention.

Reference will be made first to FIGURE 9 in order to orient the present invention in its proper environment. A pair of rotary hydraulic motors 20 and 22, which may be of the wobble-plate type, if desired, but which, regardless of type, are capable of two speeds forward and a single low speed reverse, are connected to drive wheels, not shown, located on laterally opposed sides of a vehicle. The motors 20 and 22 are provided with ports 20r and 22r respectively which are in communication with full ramp ports 21 and 23 respectively. Ports 20f and 22f and ports 20h and 22h are also provided which communicate with half ramp ports 25, 27, 29 and 31 respectively. Admitting fluid under pressure to ports 20h and 22h will result in high speed operation of both motors in a forward direction, while pressurizing of both of the ports 20h and 20f and ports 22h and 22f will provide forward rotation of both motors at low speed. Pressurizing the ports 20r and 22r will result in a rearward or reverse rotation of both motors at low speed. The motors 20 and 22 are connected by conduits 20a, 20b and 20c, and 22a, 22b and 22c to a speed selector valve 24 which is in fluid communication with a directional control valve 26. Fluid under pressure is supplied to the directional control valve 26 through conduit 28 from the outlet of an engine-driven pump 30. Fluid is supplied to the pump 30 from a reservoir 32 through a conduit 34, and is returned to the reservoir 32 from the directional control valve 26 through a conduit 36. The directional control valve 26 and speed selector valve 24 are preferably physically connected, in order to simplify construction, with complementary ports therein mated as shown in FIGURES 1 and 2. The directional control valve 26 as illustrated, is of the rotary spool type having a pair of spools 38 and 40 mounted in bores therein, which spools control the direction of fluid flow to the motors 22 and 20, respectively. The specific structure of the valve 26 will not be detailed here because reference may be had to U.S. Patent No. 3,213,881 issued Oct. 26, 1965 for the exact structure and operation thereof, albeit such detail is not necessary for an understanding of the instant invention. It will be sufficient with regard to the internal porting of this directional control valve 26 to state that the inlet port 51, as shown in FIGURE 1, is always in communication with the pressure side of the pump 30 through the conduit 28, regardless of the position of the rotary spools, and similarly the outlet port 52 is always subjected to return pressure; being connected to the reservoir 32 through conduit 36. A pair of gear sectors 72 and 73, having levers 74 and 75 secured thereto, mesh with the gears 70 and 71 attached to the free ends of the rotary spools 38 and 40, and are rotatably mounted on the valve 26 for independent rotation about a common axis. Positioning of either control lever 74 or 75 to correspond to that position shown by the solid line representation of lever 75 in FIGURE 1 will cause the associated spool to direct fluid flow from the pump 30 to effect operation of the motor controlled thereby in a forward direction, and movement of either lever to correspond to that position represented by the dotted line position illustration of lever 75 in FIGURE 1 will effect operation of the associated motor in a reverse direction. That is, the spool will be oriented in the valve 26, when the lever is moved to the aforementioned solid line position, to connect passages 80 and 82 in valve 26 and 80s and 82s in valve 24, as shown in FIGURE 9, to the pump pressure and passages 81 and 83 in valve 26 and 81s and 83s in valve 24 to the reservoir. Conversely, with the levers in the dotted line position, the spools will be oriented to pressurize passages 81, 81s, 83 and 83s while connecting passages 80, 80s and 82, 82s to the reservoir.

A spool 84 is axially slidable in a bore 85 provided in the speed selector valve 24 and is capable of assuming two positions; an extracted or outward position for high speed operation and an inserted or inward position for low speed operation.

The spool 84 is provided with lands 84a, 84b, 84c, 84d and 84e which are sealingly engageable with the bore 85. Transverse passages 24b, 24c, 24a, 85b, 85c and 85a, which are connected with conduits 22b, 22c, 22a, 20b, 20c and 20a respectively, are provided in the valve 24 and communicate with the bore 85 at points spaced progressively therealong. The passage 81s is in direct communication with transverse passage 24a, while passage 83s is connected, through passageway 83p, with that portion of the bore 85 adjacent transverse passage 85a. The passages 80s and 82s are connected, through passageways 80p and 82p respectively, with the bore 85 adjacent the transverse passages 24b and 85b respectively. When the spool 84 is positioned for low speed operation, as shown in FIGURES 4, 5, 7 and 8, the land 84b is positioned within the bore 85 to permit fluid communication between transverse passages 24b and 24c, while blocking or preventing communication between 24a and 24c. Similarly, the land 84d permits fluid communication between passages 85b and 85c, while presenting a block passages 85a and 85c. The end lands 84a and 84e are merely to prevent flow longitudinal of the bore 85 and do not enter into the control function. The center land 84c separates the two motor circuits; one motor being operated through passages 24a, 24b and 24c and conduits 22a, 22b, and 22c while the other motor is operated through the 85a, 85b and 85c passages and the 20a, 20b and 20c conduits. If either or both of the rotary spools 38 and 40 are then positioned to pressurize the passages 80s and 82s, the conduits 22c and 22b will receive fluid under pressure to operate the associated motor 22 at low speed in a forward direction and the conduits 20b and 20c will receive fluid pressure to operate the motor 20 in a similar manner. At the same time the conduits 22a and 85a will be connected to the reservoir through passages 81s and 83s respectively. If either or both of the levers 74 and 75 are rotated counterclockwise, as viewed in FIGURE 1, to orient the spools 38 and 40 in order to pressurize passages 81s and 83s, the motors will be operated at low speed in reverse; the passages 24a and 85a receiving fluid pressure and the passages 24b, 24c, 25b and 85c being connected to the reservoir 32. When the spool 84 is extracted, i.e. moved to the left as viewed in FIGURE 5, to effect high speed operation, the land 84b is shifted to block passage 24b and connect passages 24a and 24c, while the land 84d connects 85a and 85c and isolates passage 85b. When either or both of the levers 74 and 75 are moved to correspond with the solid line position of FIGURE 1, the associated motor will be operated at high speed in a forward direction.

A manual speed selector lever 86 is attached to one end of a pin 88 which is rotatably retained in a bearing 91 formed on a bracket 90 which is affixed to the valve 24. A second lever 87 is attached to the other end of the pin 88 and is connected to the spool 84 through an intermediate link 92 pinned at 94 to the lever 87 and to the spool 84. A control knob 98 is affixed to the free end of the lever 86 for grasping by the operator. As viewed in FIGURE 1, movement of this knob 98 to the right will extract the spool 84 from the valve 24 thereby positioning the spool for high speed operation. Returning the knob 98 to the position illustrated in FIGURE 1 will orient the spool for low speed operation. A latch member 100 is pivotally secured at 102 to the lever 86, and has a hook or detent means 104 formed on its free end. A recess 106, having an incline edge 108, is formed in the mating surface 24m and is capable of receiving the hook 104. A tension spring 110, secured to the bracket 90 and pinned at 112 to the latch 100 at a point intermediate its ends, serves to retain the hook 104 within the recess 106 by urging the hook into engagement with the inclined edge 108. The location of the recess 106 and the linkage, comprised of latch 100, levers 86 and 87, and link 92, are arranged to orient spool 84 in its high speed position whenever the hook 104 is inserted into the recess 106. A bellcrank 114, having an elongate arm 116 for hand manipulation by the operator, is pivotally secured at 118 to the lever 86. An actuating rod 120 is pinned at 122 to the short arm 124 of the crank 114 at a point intermediate its ends, and pivotally connected to the latch 100 utilizing, for convenience, the pin connection at 112. Movement of the elongate arm 116 toward the knob 98 will cause the bellcrank 114 to pivot at 118 in a counterclockwise direction moving the pivot at 122 upward. The control rod 120 will transfer this motion to the latch member 100 pivoting it in a counterclockwise direction about the pivot 102 against the bias of the spring 110, and thereby extract the hook 104 from the recess 106. Once the hook 104 is disengaged, the operator may move the knob 98 to the left shifting the spool 84 to its low speed position, which position is illustrated in FIGURE 1. To shift the spool 84 to its high speed position, the operator moves the knob 98 to the right. The hook 104 will drop into and be retained within recess 106 by the force of the spring 110.

A stop bar 130 is affixed to an arm 132 which is attached to a shaft 134. A bearing 136 mounted on the valve 26 pivotally supports the shaft 134. The bar 130 extends transversely of, and is capable of being contacted by, the levers 74 and 75. A crank 138 having a protruding pin 140 is secured to the shaft 134. A second protruding pin 141 is provided on the end of the short arm 124. A link 142 extends between the two pins 140 and 141, which pins are slidably retained in a pair of slots 146 and 144, respectively. The length of the slots 144 and 146 and their position on the link 142, as well as the offset angular position of the crank arm 134 relative to the crank 132, are such that when the lever 86 is positioned to permit the hook 104 to drop into the recess 106, the pins 140 and 141 will be in contact with the inner surfaces of the slots, thereby placing the link 142 under a compressive stress sufficient to force the stop bar 130 to the dotted line position shown in FIGURE 1. If either of the levers 74 and 75 are then moved to reverse the operation of a motor, i.e. to the dotted line position in FIGURE 1, the latter will engage the stop bar and pivot the crank arm 138 counterclockwise causing the link 142 to pivot the bellcrank 114. The counterclockwise motion of the bellcrank 114 will be transmitted to the latch member 100 through control rod 120 extracting the hook from the recess 106. Once the latch member is so released, the spring 110 will urge the lever to rotate counterclockwise moving the spool 84 to its low speed position. It can be appreciated, therefore, that the spool 84 will be positioned within the speed selector valve 26 to provide high speed operation of both of the hydraulic motors by the action of the spring 110 and the hook 104 and recess 106. Further, this arrangement requires a positive action on the part of the operator to reposition the spool 84 to achieve low speed operation precluding the accidental re-positioning thereof as might be occasioned by vibration, etc., which positive control is provided by the convenient arrangement of the pivotal attachment of the bellcrank 114 on the lever 86 and the close proximity of the knob 98 to the elongate arm 116 which permits a simple gripping manipulation to release the latch. In addition, in the event the operator moves either of the control levers 74 and 75 to reverse one or both of the associated hydraulic motors, the linkage arrangement assures that the spool 84 will be positioned for low speed operation. Such an arrangement is highly desirable from a safety standpoint in that its prevents the operator from driving one wheel at high speed in a forward direction and the other, transversely spaced, wheel at low speed in the opposite or reverse direction. Since vehicles of the type for which this invention is intended are often operated on hilly or uneven terrain, a potential safety hazard would exist if a sharp turn were negotiated at high speed. The stop bar 130, and the linkage connected therewith, assures all sharp turns, i.e. those turns requiring reversal of one motor, will be executed at slow speed.

Attention is directed to the means for automatically shifting to a low speed operation in the event a predetermined differential occurs between pump and reservoir pressures. As shown in FIGURES 1 and 6, the recess 106 is positioned above the chamber 56 and is open to the bore 63. The upper surface of the plunger 66 is contiguous with the lower surface of the recess 106 where the piston 58 is in contact with the bottom of the chamber 56. The plunger 66 will maintain such a position as long as the product of the smaller circular area of the extension 60 and the pump pressure existing at port 51 is less than the product of the larger ring area, consisting of the annular upper surface of the piston 58, and the return or reservoir pressure existing at port 52. However, the plunger 66 will move upward into the recess 106 whenever the pressure differential is great enough to overcome the difference in area. In addition, one other factor, the downward component of force exerted by the spring 110 will affect the position of the plunger 66. With the hook 104 positioned within the recess 106, the spool 84 being oriented for high speed operation, the plunger 66 will be retracted until the pressure differential can overcome the aforementioned component, at which point the plunger 66 will force the latch 100 upward against the bias of the spring 110 disengaging the hook 104 from the inclined edge 108 of the recess 106. The lever 86 will then be rotated in a counterclockwise direction by the horizontal component of the spring force, and the spool 84 shifted to low speed position. If the knob 98 is moved to the right, in order to attain high speed operation, whenever the pressure differential is such that the plunger is protruding into the recess 106, the latch 100 will be engaged only if the vertical component of the spring is larger than the force provided by the pressure differential. Thus, it will be appreciated this arrangement provides a means to prevent the shifting of either motor into high speed operation when the load imposed thereon is too great. That is, the differential in pressure between inlet and outlet increases as the resistance to rotation encountered by the motor increases. Therefore, the motors will be operated in their low speed, high torque range when it is desirable to do so, and stalling of the engine driving the pump will be obviated. Efficient operation of the vehicle is achieved without requiring the operator to estimate the resistance to which the motors are being subjected.

While one embodiment of the invention has been shown and described herein, it will be understood that various modifications and alterations may be made therein without departing from the scope of the invention as defined by the appended claims.

What is claimed is:

1. In a combination with a hydraulic circuit including a source of fluid under pressure for controlling a two-speed hydraulic motor having a pair of pressure ports and a return port;
   a valve body,
   a valve spool movable within said body between a low-speed position wherein both of said pressure ports are connected to said source and a high-speed position wherein only one of said pressure ports is connected to said source,
   bias means for urging said spool into its low-speed position,
   latch means for holding said spool in its high-speed position,
   and release means responsive to a predetermined differential at said one port and said return port for disengaging said latch means.

2. In a combination according to claim 1 wherein said latch means comprises;
   an operating lever pivotally mounted on said body and operatively connected to said spool,
   a latch arm having a hook on one end pivotally attached at its other end to said lever, and
   said body having a recess formed therein capable of receiving and retaining said hook when said lever is pivoted to move said spool to its low-speed position.

3. In a combination according to claim 2 and further comprising;
   a bellcrank pivotally supported on said lever and having an elongate arm for manual grasping and a second arm,
   a rod connected between said second arm and said latch arm,
   whereby pivoting of said bellcrank relative to said lever will retract said hook from said recess.

4. In a combination according to claim 3, wherein said motor is reversible, and further comprising:
   a directional valve having a control means hydraulically connected to said motor through said body,
   said control means having a center neutral position and forward and reverse positions,
   bar means pivotally mounted on said body and positioned to be contacted by said control means in its reverse position,
   link means operatively connected between said second arm and said bar means and arranged to cause pivoting of said bellcrank in response to pivoting of said bar means,
   whereby said spool will always be moved to its low-speed position whenever said control means is moved to its reverse position.

5. A means for controlling a pair of hydraulic motors which are capable of two speeds forward and a single speed in reverse arranged to independently drive laterally spaced, ground-engaging wheels on a vehicle comprising;
   first and second directional valves having control means independently movable in either direction from a central neutral position to forward and reverse positions to selectively control the direction of rotation of said motors,
   a speed selector valve hydraulically connected between said directional valve and said motors, and capable of assuming a low-speed position and a high speed position,
   bias means for urging said selector valve into its low-speed position,
   latch means for holding said selector valve against the force of said bias means in its high-speed position,
   and release means responsive to a predetermined pressure differential between the inlet and outlet of said motors for disengaging said latch means.

6. A control means according to claim 5, wherein said latch means includes an operating lever, and further comprising;
   a bellcrank pivotally carried by said lever and having an elongate arm for manual grasping and a short arm, and
   a rod connected between said latch means and said short arm,
   whereby pivoting of said bellcrank relative to said lever will effect disengagement of said latch means independently of said release means.

7. A control means according to claim 6 and further comprising;
   bar means pivotally mounted in the path of both of said directional valve control means as determined by movement from said neutral position to said reverse position, and link means operatively connected between said short arm and said bar means to cause pivoting of said bellcrank in response to pivoting of said bar means, whereby said selector valve is always shifted to its low-speed position whenever either of said motors is reversed.

8. A control means according to claim 7 wherein said latch means includes;

a bar pivotally attached at one end of said lever and having a hook means at the other end, one of said valves having a recess formed on a surface thereof, and said recess being capable of receiving and retaining said hook means.

9. A control means according to claim 8 wherein said release means comprises;

a chamber formed in one of said valves and opening into said recess, a differential-area piston reciprocably retained within said chamber, said piston having a stroke sufficient to permit said hook to engage said recess when said piston is retracted and to permit the end of said shank to be substantially flush with said surface when said piston is extended, passageways in said one valve for subjecting the smaller area of said piston to said inlet pressure and the larger area to said outlet pressure, whereby said shank will disengage said hook from said recess whenever a predetermined pressure differential exists between inlet and outlet pressures.

10. A control means according to claim 9 wherein said bar means comprises;

a pin means journaled on said directional valve, first and second crank arms affixed to each end of said pin means, a stop bar secured to said first crank arm and extending across the path of both said directional control means, a first pivot pin affixed to said second crank arm, a second pivot pin affixed to said short arm of the bellcrank, a pair of slots formed in said link means, and said pivot pins positioned and retained in said slots.

No references cited.

EDGAR W. GEOGHEGAN, *Primary Examiner.*